United States Patent
Zhang et al.

(10) Patent No.: US 8,418,579 B2
(45) Date of Patent: Apr. 16, 2013

(54) PARALLEL ROBOT

(75) Inventors: Guo-Qing Zhang, Shenzhen (CN);
Zhi-Ming Zhao, Shenzhen (CN); Jiong Zhou, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 458 days.

(21) Appl. No.: 12/826,984

(22) Filed: Jun. 30, 2010

(65) Prior Publication Data
US 2011/0120254 A1 May 26, 2011

(30) Foreign Application Priority Data
Nov. 23, 2009 (CN) .......................... 2009 1 0310233

(51) Int. Cl.
*B25J 17/00* (2006.01)
*B25J 17/02* (2006.01)
*B25J 18/00* (2006.01)

(52) U.S. Cl.
USPC .................... 74/490.04; 74/490.01

(58) Field of Classification Search ............... 74/490.01, 74/490.04
See application file for complete search history.

(56) References Cited

U.S. PATENT DOCUMENTS

| 2004/0250644 A1* | 12/2004 | Gosselin et al. ........... 74/490.04 |
| 2008/0141813 A1* | 6/2008 | Ehrat ......................... 74/490.01 |
| 2010/0139436 A1* | 6/2010 | Kawashima et al. ...... 74/490.01 |
| 2011/0100145 A1* | 5/2011 | Feng .......................... 74/490.01 |
| 2011/0113915 A1* | 5/2011 | Zhang et al. ............... 74/490.01 |
| 2011/0162805 A1* | 7/2011 | Cheng .......................... 156/578 |

FOREIGN PATENT DOCUMENTS

| CN | 101518491 A | 9/2009 |
| CN | 101554727 A | 10/2009 |
| JP | 2000148382 A | 5/2000 |

* cited by examiner

*Primary Examiner* — Justin Krause
(74) *Attorney, Agent, or Firm* — Altis Law Group, Inc.

(57) ABSTRACT

A parallel robot includes a base, a movable platform, a plurality of control arms, a rotation arm, a plurality of first actuators, and a second actuator. The control arms rotatably interconnect to the base and the movable platform, respectively. Opposite ends of the rotation arm are universally rotatably connected to the base and the movable platform, respectively. The first actuators move the control arms, respectively. The second actuator rotates the rotation arm around a central axis. Each control arm comprises a first transmission member and a transmission cable. The first transmission member comprises a fan-shaped transmission portion. Each first actuator comprises a transmission shaft to engage the first transmission member of the control arm. The transmission cable coils around the transmission shaft for at least one winding, then criss-crosses, and winds on the fan-shaped transmission portion.

12 Claims, 5 Drawing Sheets

PARALLEL ROBOT

BACKGROUND

1. Technical Field

The present disclosure generally relates to robotics, and particularly, to a parallel robot having a simplified structure.

2. Description of the Related Art

Parallel robots have advantages of stability, load-bearing, favorable weight to load ratio, and dynamic characteristics among other things. As parallel robots and series robots cooperate together, they may be used together in many fields.

Some parallel robots include a bracket (also known as a base), a movable platform, a shaft, and three control arms. The shaft and the control arms connect the movable platform to the bracket. Each control arm includes an actuator mounted on the bracket, a first linking rod hinged to the movable platform, and a second linking rod hinged between the actuator and the first linking rod. The actuator includes a servo motor and a decelerator. The decelerator interconnects the servo motor and the first linking rod to adjust a rotation speed of the first linking rod. However, the decelerator has a relatively high cost, and a more complex construction, thereby making it difficult to maintain.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
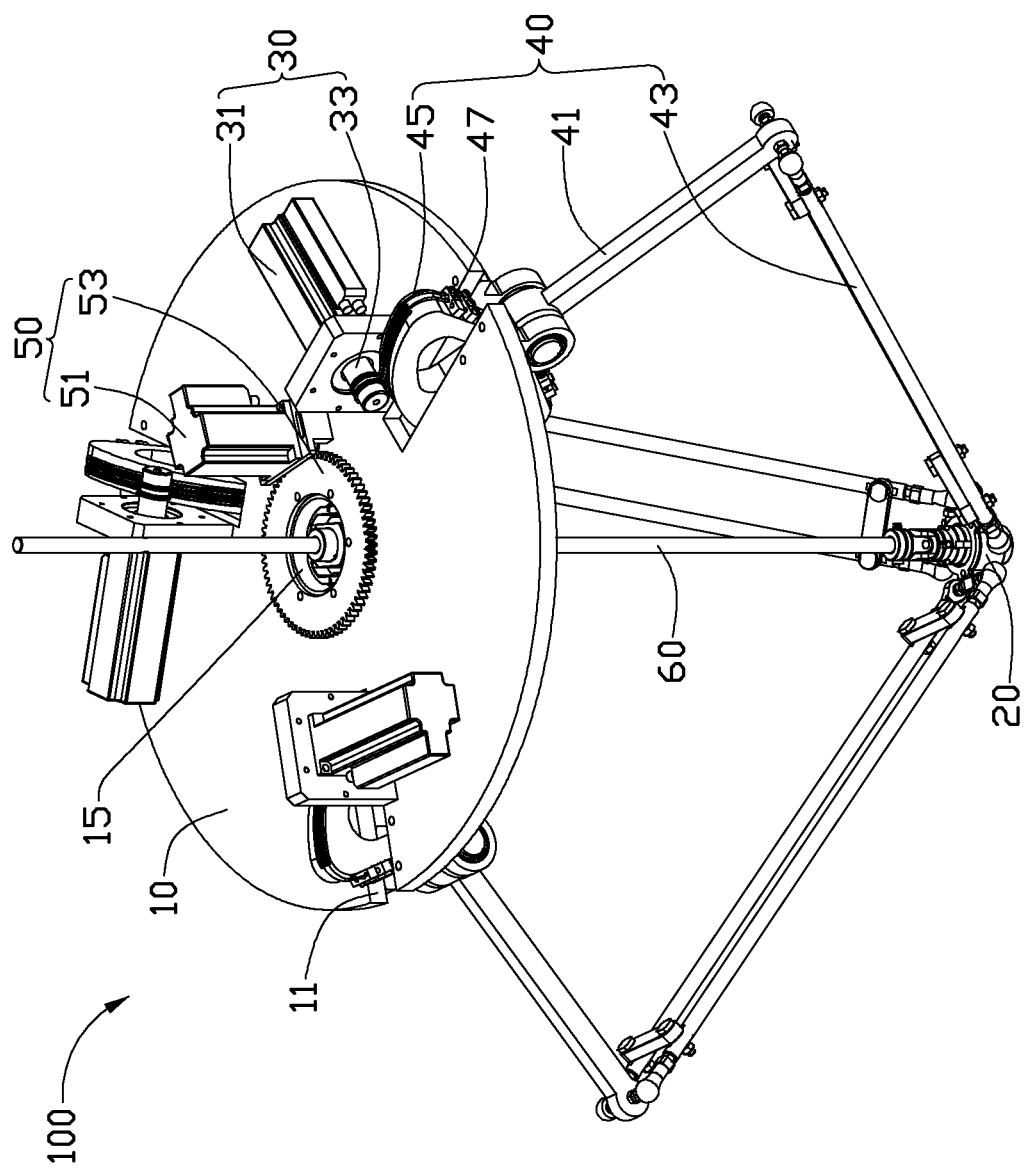
FIG. 1 is an assembled view of a parallel robot of an embodiment of the disclosure, the parallel robot including a bracket, a movable platform, three control arms, and a rotation arm.

Referring to FIG. 1, an embodiment of a parallel robot 100 is shown. The parallel robot 100 includes a base 10, a movable platform 20, and three control arms 40 rotatably interconnecting the base 10 and the movable platform 20, and a rotation arm 60. The parallel robot 100 further includes three first actuators 30 and a second actuator 50 mounted on the base 10.

Figure 2:
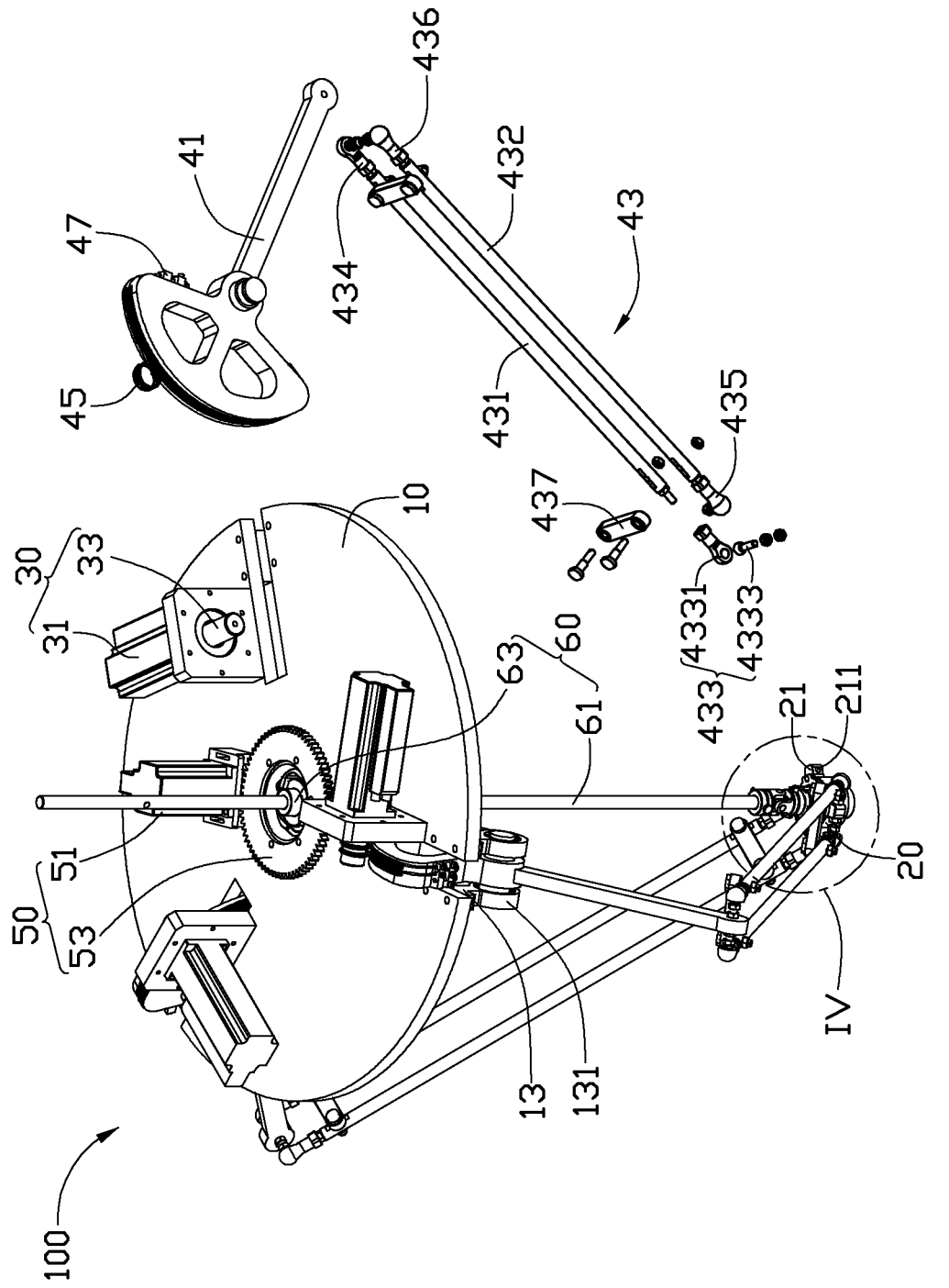
FIG. 2 is an exploded, isometric view of the parallel robot of FIG. 1.

Referring to FIGS. 1 and 2, the base 10 can be substantially circular, defining three cutouts 11 at a periphery thereof and a mounting hole 15 in the center. The base 10 also includes three connecting portions 13 adjacent to the cutouts 11, each including a support bearing 131.

Figure 4:
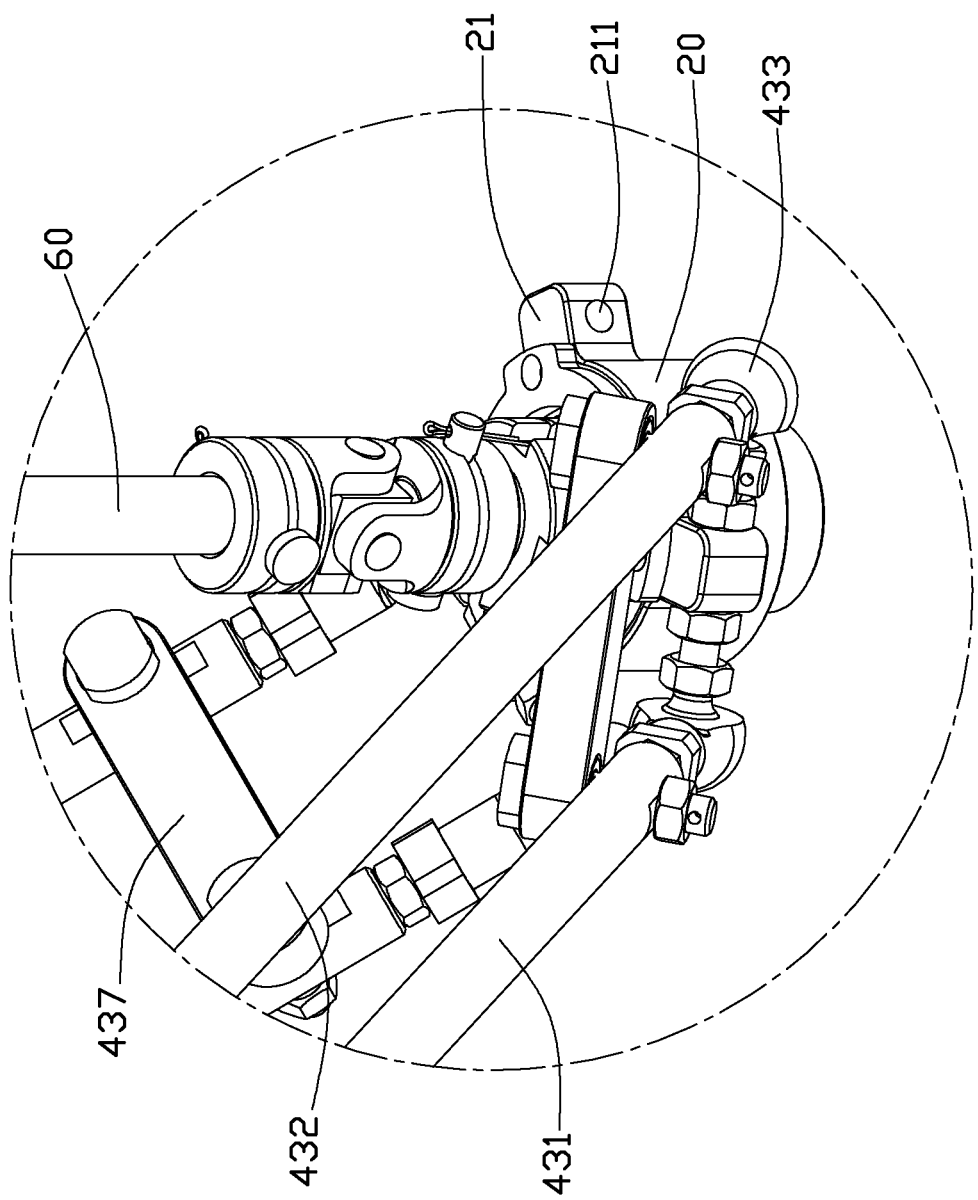
FIG. 4 is an enlarged view of region IV of FIG. 2.

Referring to FIGS. 2 and 4, the movable platform 20 includes three connecting portions 21, and each defining a connecting hole 211.

Each first actuator 30 is mounted at a side of one corresponding cutout 11, for driving the corresponding control arm 40. The first actuator 30 includes a motor 31 and a transmission shaft 33 axially connected to the motor 31.

Figure 5:
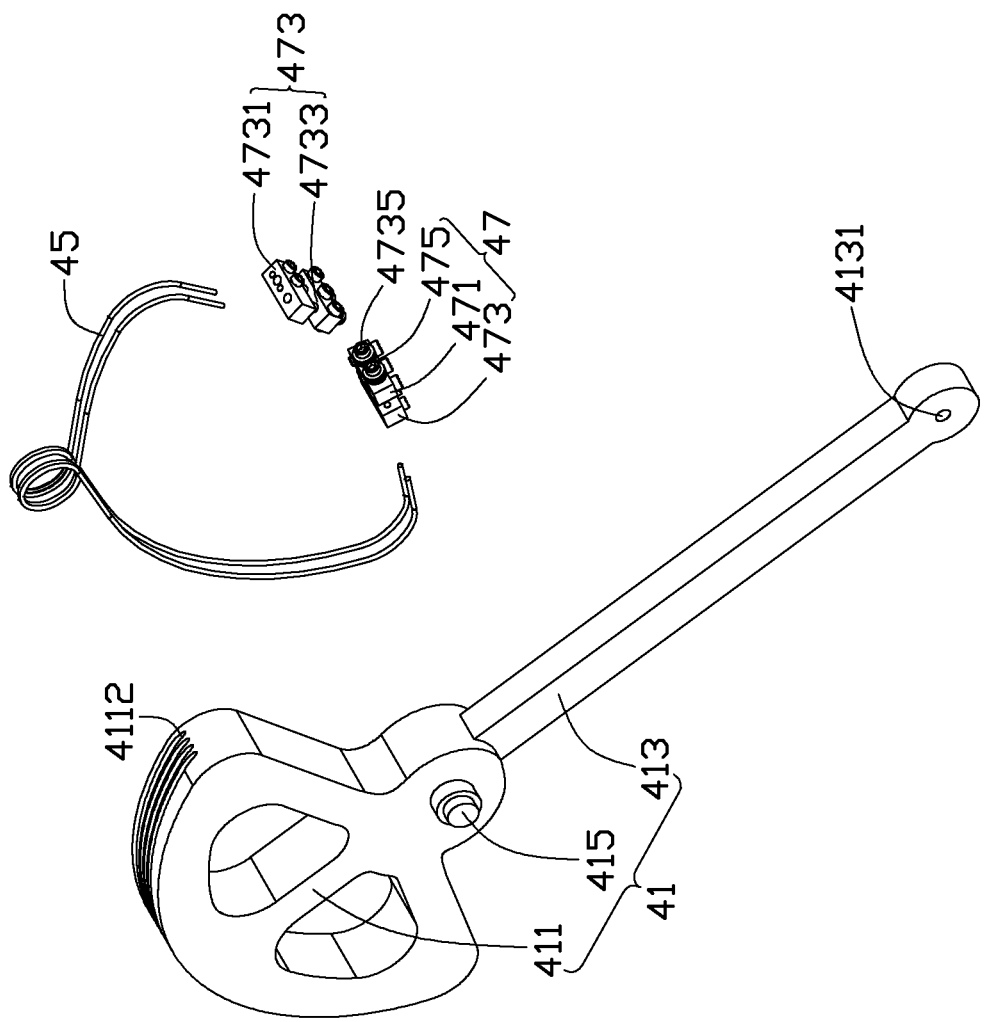
FIG. 5 is an exploded, isometric view of another part of one control arm of the parallel robot of FIG. 1.

Referring to FIGS. 2 and 5, each control arm 40 includes a first transmission member 41, a second transmission member 43, a plurality of transmission cables 45 and two fixing assemblies 47. One end of the first transmission member 41 is connected to the connecting portion 13 of the base 10, and an opposite end of the first transmission member 41 is connected to one end of the second transmission member 43. An opposite end of the second transmission member 43 is connected to the connecting portion 21 of the movable platform 20. The first transmission member 41 is rotatably connected to the second transmission member 43. A middle portion of the transmission cables 45 are coiled around the transmission shaft 33 of the first actuators 30, and then criss-crossed. Opposite ends of the plurality of transmission cables 45 are wound on the first transmission member 41, and finally the opposite ends of the transmission cables 45 are fixed to the two fixing assemblies 47.

Referring to FIG. 5 again, the first transmission member 41 includes a fan-shaped transmission portion 411, a bar 413, and a rotating shaft 415. The fan-shaped transmission portion 411 defines a plurality of guide grooves 4112 at a side surface of the fan-shaped transmission portion 411. The plurality of guide grooves 4112 extend in the same direction side by side, respectively. The bar 413 is formed at the centre of a circle of the fan-shaped transmission portion 411, and defines a connecting hole 4131 at a free end of the bar 413. The bar 413 is rotatably connected to the transmission member 411 via the rotating shaft 415 passing through the transmission member 411 and one end of the bar 413. A center angle of the fan-shaped transmission member 411 is predetermined according to a desired range of motion of the movable platform 20.

Figure 3:
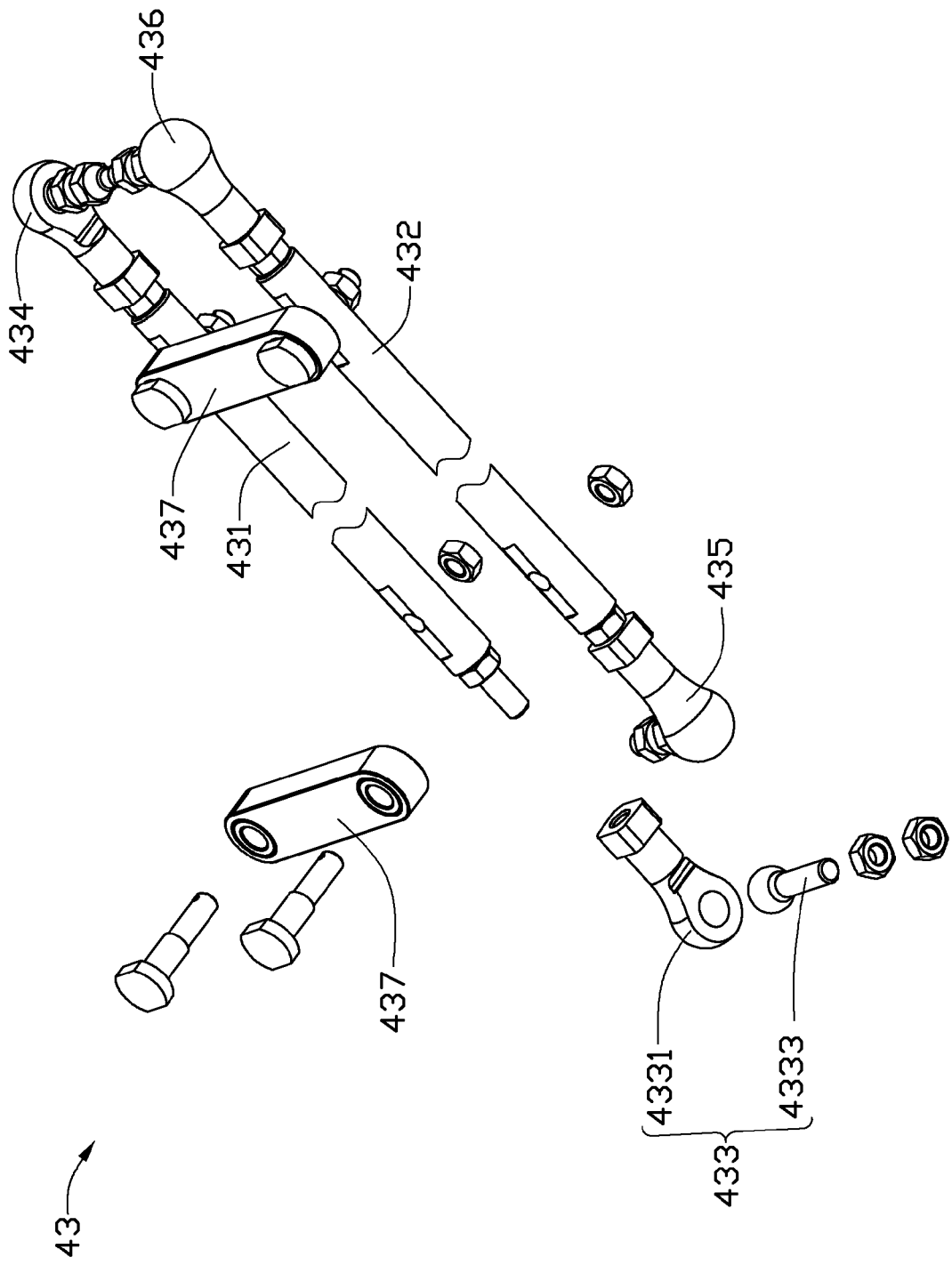
FIG. 3 is an exploded, isometric view of one part of one control arm of the parallel robot of FIG. 1.

Referring to FIGS. 3 and 4 again, the second transmission member 43 has a four-rod linkage structure. The second transmission member 43 includes a first rod 431, a second rod 432, a first pivot unit 433, a second pivot unit 434, a third pivot unit 435, a fourth pivot unit 436, and two connecting bars 437 interconnecting the first rod 431 and the second rod 432. Each of the first, second, third, fourth pivot units 433, 434, 435, 436 includes a first rotating member 4331 and a second rotating member 4333 universally rotatably connected to the first rotating member 4331. That is, the first, second, third, fourth pivot units 433, 434, 435, 436 are ball hinges. The first rotating members 4331 of the first pivot unit 433 and the second pivot unit 434 are connected at opposite ends of the first rod 431. The first rotating members 4331 of the third pivot unit 435 and the fourth pivot unit 436 are connected at opposite ends of the second rod 432. The second rotating members 4333 of the first pivot unit 433 and the third pivot unit 435 are connected to the connecting portion 21 of the movable platform 20. The second rotating members 4333 of the second pivot unit 434 and the fourth pivot unit 436 are connected to the connecting hole 4131 of the first transmission member 41, so as to be movably coupled to the first transmission member 41. The connecting bars 437 are slidable on the first rod 431 and the second rod 432.

The transmission cables 45 are parallel and coiled on the transmission shaft 33 of the first actuator 30 and the first transmission member 41 in a "∝" shape. Each transmission cable 45 winds at least one full turn/loop around the transmission shaft 33, crosses over itself, and is then received in the guide grooves 4112 at a periphery of the fan-shaped transmission portion 411. Opposite ends of each transmission member 45 are arranged in the two adjacent guide grooves 4112 of the first transmission member 41, respectively. The number of windings of the transmission cable 45 on the transmission shaft 33 can be adjusted according to the friction between the transmission cable 45 and the transmission shaft 33 and the transmission power required. A height difference of opposite ends of each transmission cable 45 equals a product between a diameter of the transmission cable 45 and the transmission ratio. A space between the two adjacent guide grooves 4112 equals a product between the diameter of the transmission cable 45 and the number of windings of the transmission cable 45 on the transmission shaft 33. In the illustrated embodiment, each transmission cable 45 coils twice around the transmission shaft 33. The transmission cable 45 may be wire cable, or other material having sufficient mechanical strength. In the illustrated embodiment, the transmission cable 45 is a wire cable, capable of providing higher transmission precision, improved rigidity and steady transmission. There may further be any number of transmission cables 45, additionally influencing strength of the transmission cables 45.

Each fixing assembly 47 includes a positioning member 471, a fastener 473 and a resilient member 475. In the illustrated embodiment, two fixing assemblies 47 are located at two sides of the fan-shaped transmission portion 411, respectively. The positioning members 471 are fixed to the fan-shaped transmission portion 411 and resist opposite ends of the guide grooves 4112 of the fan-shaped transmission portion 411, respectively. The fastener 473 includes a fixing block 4731 and a fastener bolt 4733 passing through the positioning member 471 and fastened with the fixing block 4731. The fixing block 4731 defines a fixing hole (not labeled). One end of the transmission cable 45 passes through the fixing hole of the fixing block 4731, and is fixed on the fixing block 4731. The other end of the transmission cables 45 is fixed on another fixing block 4731 in the same manner as described. The fastener bolt 4733 has a head 4735. The resilient member 475 includes a plurality of saucer-shaped spacers arranged in stacking formation and are sleeved on the fastener bolt 4733. Opposite ends of the resilient member 475 resist the head 4735 of the fastener bolt 4733 and the positioning member 471, respectively.

Referring to FIG. 1, the second actuator 50 is mounted adjacent to the mounting hole 15 to rotate the rotation arm 60 around a central axis. The second actuator 50 includes a motor 51, a first gear (not shown) engaging a second gear 53. The second gear 53 is connected to and drives the rotation arm 60.

The rotation arm 60 includes a rotation rod 61 and a bearing 63 sleeved on the rotation rod 61. The rotation rod 61 is movably connected to the movable platform 20. The bearing 63 is movably connected to the second gear 53.

Referring to FIGS. 1 through 5, during assembly of the parallel robot 100, the first actuators 30 and the second actuator 50 are mounted on the base 10. Opposite ends of each rotating shaft 415 are received in the support bearings 131 of one corresponding connecting portion 13 of the base 10, such that the first transmission members 41 are rotatably connected to the base 10. The fan-shaped transmission portion 411 protrude through the cutouts 11 to engage the transmission shafts 33 of the first actuators 30. The transmission cables 45 are parallel and coiled on the transmission shaft 33 of the first actuator 30 and the first transmission member 41 with a "∞" shape. Each second transmission member 43 is rotatably connected to the corresponding first transmission member 41 by the second rotating members 4333 of the second pivot unit 434 and the fourth pivot unit 436 passing through the connecting hole 4131 of the rod 413. Each second transmission member 43 is rotatably connected to the movable platform 20 by the second rotating members 4333 of the first pivot unit 433 and the third pivot unit 435 passing through the connecting hole 211 of the corresponding connecting portion 21. An end of the rotation rod 61 of the rotation arm 60 is received in the mounting hole 15 of the base 10, and rotatably connected to the base 10. The bearing 63 is fixed to the second gear 53 of the second actuator 50.

During operation, the first actuators 30 rotate the first transmission members 41, thus moving the second transmission members 43 on three axes. Therefore, the movable platform 20 can move on three axes with respect to the base 10. It can be understood that the movable platform 20 may move in only one, two, or all three of the described axes. The second actuator 50 rotates the first gear (not shown) and the second gear 63, thus rotating the rotation arm 60. As such, an end of the rotation arm 60 not only moves in the three axes, but also can rotate around the central axis thereof.

A rotation speed is decelerated by means of the engagement of the fan-shaped transmission portion 411 and the transmission shaft 33, such that no additional members, such as a gear box or other complex structures, are needed. Therefore, the parallel robot 100 has lower manufacturing cost and lower maintaining cost. In addition, compared with a circular body, the fan-shaped transmission portion 411 occupies less space, requires less driving force, and generates less rotational inertia. Therefore, transmission precision is improved. Only two or more than three control arms 40 may alternatively be deployed.

In addition, the guide grooves 4112 of the fan-shaped transmission portion 411 are substantially parallel and can receive different parts of one transmission cable 45, such that a distance provided between the two adjacent guide grooves 4112 prevents the transmission cables 45 from contacting themselves at the intersection, thereby avoiding attendant friction and extending service life.

Elastic force created by the resilient member 475 helps to maintain the firmness or snugness of the transmission cables 45. When the transmission cable 45 loosens, the fastener bolts 4733 can be used to resist the resilient member 475 and restore firmness or tightness.

Finally, while the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:
1. A parallel robot, comprising:
a base;
a movable platform;
a plurality of control arms rotatably connected to the base and the movable platform, respectively;
a rotation arm having opposite ends universally rotatably interconnecting the base and the movable platform, respectively, and the rotation arm being rotatable around a central axis thereof;
a plurality of first actuators moving the control arms, respectively; and
a second actuator rotating the rotation arm around the central axis thereof;
wherein each control arm comprises a first transmission member and a transmission cable, the first transmission member comprising a transmission portion, each first actuator comprising a transmission shaft, the transmission cable coiling around the transmission shaft, and criss-crossed wound on the transmission portion, such that the first transmission member is driven by the transmission shaft via the transmission cable, each control arm further comprises at least one fixing assembly fixing the opposite ends of the transmission cable, and fixed on the first transmission member.

2. The parallel robot of claim 1, wherein the transmission cable is a wire cable.

3. The parallel robot of claim 1, wherein each control arm further comprises a second transmission member having an end rotatably connected to the first transmission member and an opposite end of the second transmission member rotatably connected to the movable platform.

4. The parallel robot of claim 3, wherein the base comprises a plurality of connecting portions; the first transmission member further comprises a bar and a rotating shaft passing through the transmission portion and an end of the bar; and the rotating shafts of the first transmission members of the control arms rotatably engage the connecting portions of the base.

5. The parallel robot of claim 4, wherein the base defines a plurality of cutouts, the first actuators and the second actuator are mounted on the base; and the transmission portions of the first transmission members of the control arms pass through the cutouts, respectively.

6. The parallel robot of claim 4, wherein each connecting portion comprises a support bearing to rotatably receive the rotating shaft.

7. The parallel robot of claim 4, wherein the second transmission member of each control arm comprises a first rod, a second rod, a first pivot unit, a second pivot unit, a third pivot unit, a fourth pivot unit, and two connecting bars connecting the first rod and the second rod; the first and third pivot units rotatably connect the first rod and the second rod to the movable platform; and the second and fourth pivot units rotatably connect the first rod and the second rod to the first transmission member.

8. The parallel robot of claim 7, wherein each of the first, second, third, and fourth pivot units comprises a first rotating member and a second rotating member universally and rotatably connected; the first rotating members of the first pivot unit and the second pivot unit are connected at opposite ends of the first rod; the first rotating members of the third pivot unit and the fourth pivot unit are connected at opposite ends of the second rod; the second rotating members of the first pivot unit and the third pivot unit are connected to the connecting portion of the movable platform; and the second rotating members of the second pivot unit and the fourth pivot unit are connected to the bar.

9. The parallel robot of claim 1, wherein each of the first actuators further comprises a motor rotating the transmission shaft thereof.

10. The parallel robot of claim 1, wherein the second actuator comprises a motor and a second gear rotated thereby, the motor being mounted on the base, and the rotation arm is connected to the second gear and thus rotated by the motor.

11. The parallel robot of claim 1, wherein the at least one fixing assembly comprises a positioning member fixed on the first transmission member and a fastener connecting with the positioning member.

12. The parallel robot of claim 11, wherein the fixing assembly further comprises a resilient member sleeved on the fastener, the fastener comprising a fastener bolt, the fastener bolt comprising a head, and the resilient member is arranged between the head of the fastener bolt and the positioning member.

* * * * *